(12) United States Patent
Nakahata (10) Patent No.: US 7,728,861 B2
(45) Date of Patent: *Jun. 1, 2010

(54) OPTICAL DEVICE

(75) Inventor: Hiroshi Nakahata, Chiba-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 282 days.

This patent is subject to a terminal disclaimer.

(21) Appl. No.: 11/878,472

(22) Filed: Jul. 25, 2007

(65) Prior Publication Data

US 2008/0267665 A1    Oct. 30, 2008

Related U.S. Application Data

(62) Division of application No. 11/146,112, filed on Jun. 7, 2005, now Pat. No. 7,298,390.

(30) Foreign Application Priority Data

Jun. 7, 2004    (JP)    .............................. 2004-168043

(51) Int. Cl.
*B41J 2/435* (2006.01)
*B41J 27/00* (2006.01)

(52) U.S. Cl. .................. 347/231; 347/243; 347/259

(58) Field of Classification Search ................ 347/231, 347/239, 243, 255, 259, 260
See application file for complete search history.

(56) References Cited

U.S. PATENT DOCUMENTS

| | | | |
|---|---|---|---|
| 4,842,396 A | 6/1989 | Minoura et al. ............. 359/212 |
| 5,627,649 A * | 5/1997 | Sawayama et al. .......... 358/296 |
| 5,969,741 A | 10/1999 | Appel et al. ................. 347/136 |
| 7,068,415 B2 | 6/2006 | Mushika ...................... 359/291 |
| 7,181,143 B2 | 2/2007 | Takahashi et al. ........... 398/131 |
| 7,298,390 B2 * | 11/2007 | Nakahata ..................... 347/231 |
| 7,570,278 B2 * | 8/2009 | Ueda ............................ 347/244 |
| 2005/0152019 A1 | 7/2005 | Mushika ...................... 359/291 |

FOREIGN PATENT DOCUMENTS

| | | |
|---|---|---|
| JP | 1-271087 | 10/1989 |
| JP | 7-175005 | 7/1995 |
| JP | 7-261103 | 10/1995 |
| JP | 9-105876 | 4/1997 |
| JP | 10-142546 | 5/1998 |
| JP | 11-237578 | 8/1999 |
| JP | 11237578 A * | 8/1999 |
| JP | 2002-6211 | 1/2002 |
| JP | 2002-244063 | 8/2002 |
| JP | 03/065103 | 8/2003 |

OTHER PUBLICATIONS

Partial English language translation of Japanese Office Action in corresponding Japanese Application No. 2004-168043.

* cited by examiner

*Primary Examiner*—Hai C Pham
(74) *Attorney, Agent, or Firm*—Fitzpatrick, Cella, Harper & Scinto (57) ABSTRACT

A laser beam source that emits a laser beam includes a reflecting unit that has a plurality of reflecting members and reflects the laser beam emitted from the laser beam source, a deflecting and scanning unit that deflects and scans with the laser beam reflected by the reflecting means, and an adjusting unit that moves at least part of the reflecting members, and adjusts the size of the laser beam entering the deflecting and scanning unit.

9 Claims, 12 Drawing Sheets

OPTICAL DEVICE

This application is a division of application Ser. No. 11/146,112, filed Jun. 7, 2005, the contents of which are incorporated herein by reference.

BACKGROUND OF THE INVENTION (a) Field of the Invention

The present invention relates to an image forming apparatus such as an electrophotographic copying machine or printer, and, more particularly, to a method of adjusting a spot diameter with a scanning-type optical device.

(b) Description of the Related Art

Figure 11:
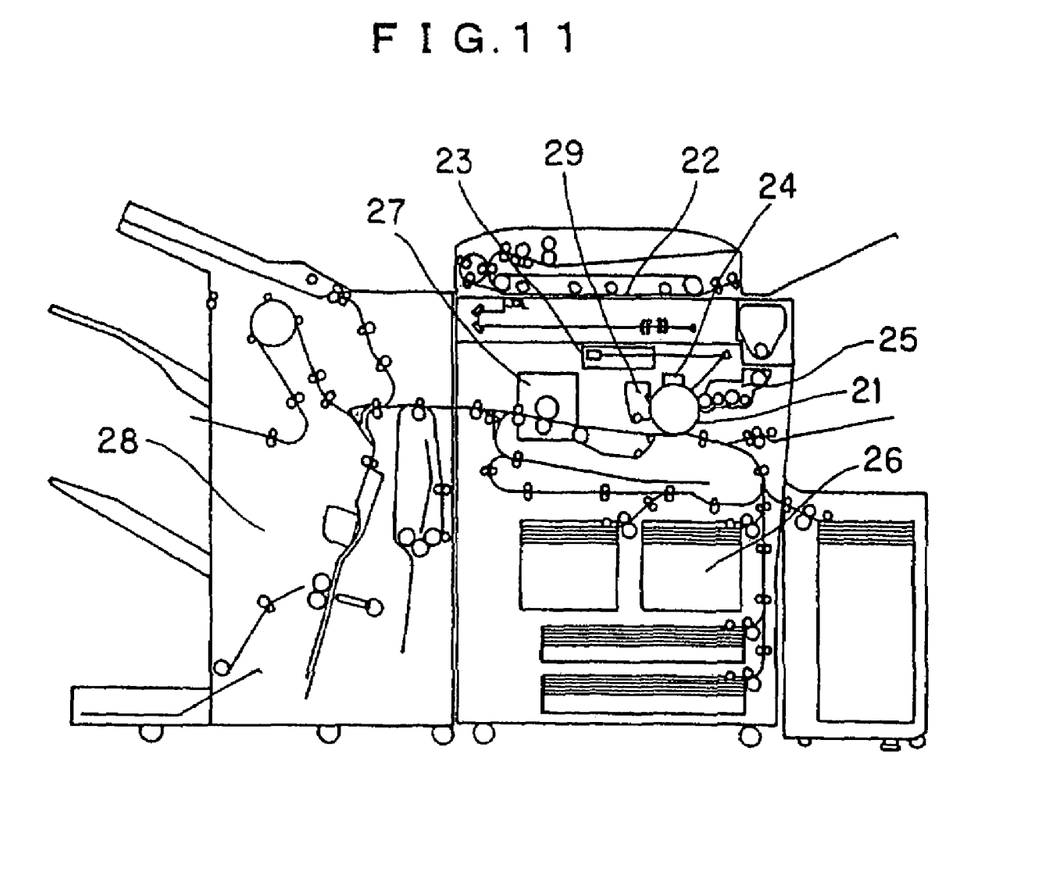
FIG. 11 is a schematic cross-sectional view of a conventional image forming apparatus.
Figure 12:
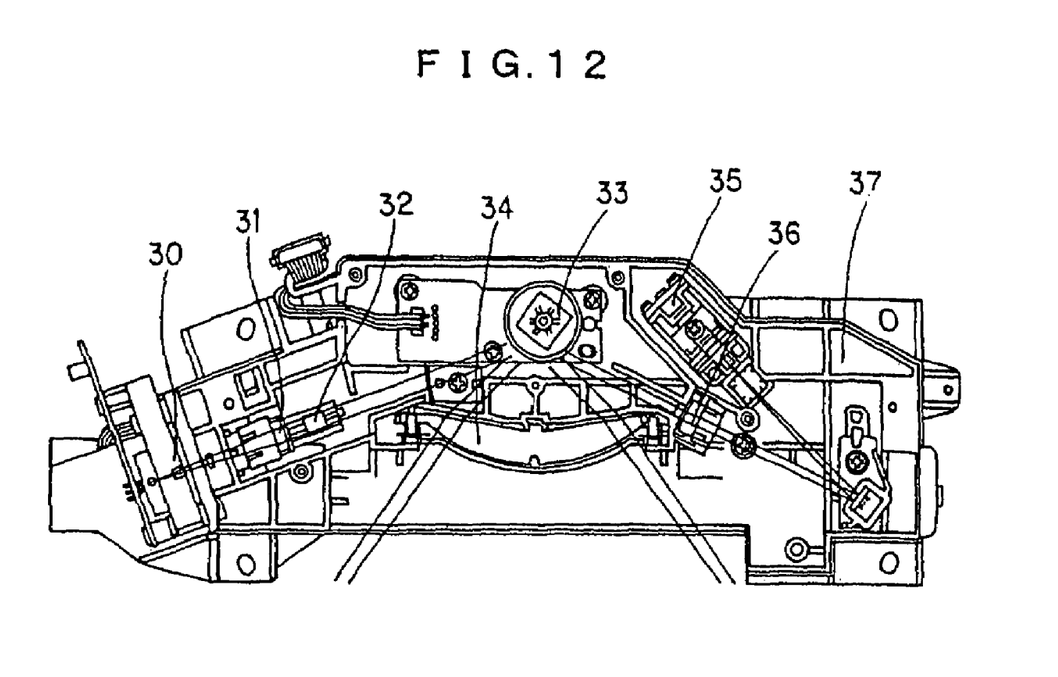
FIG. 12 illustrates a conventional scanning-type optical device.

Referring to FIGS. 11 and 12, the related art will be described below.

FIG. 11 illustrates the entire structure of an image forming apparatus. A photosensitive drum 21 that is an example of an image bearing member has a photosensitive layer applied onto a conductive body, and forms an electrostatic latent image with laser beams emitted from a scanning-type optical device 23. Reference numeral 22 denotes an image reading unit that reads image information from an original placed onto an original base plate. Reference numeral 23 denotes the scanning-type optical device that irradiates the photosensitive drum 21 with the laser beams based on the image information transmitted from the image reading unit 22 or a personal computer or the like. Reference numeral 24 denotes a charger that charges the photosensitive drum 21. Reference numeral 25 denotes a developing unit that forms a toner image with triboelectrically charged toner, based on the electrostatic latent image formed on the photosensitive drum 21. Reference numeral 26 denotes a sheet feeding cassette that stores sheets that serve as recording materials. Reference numeral 27 denotes a fixing unit that fixes the toner image transferred onto a sheet by virtue of heat. Reference numeral 28 denotes a post processing unit on which image-fixed sheets are collectively placed. Reference numeral 29 denotes a cleaner that removes the toner remaining on the photosensitive drum 21 after the image transfer.

The scanning-type optical device 23 emits laser beams based on image information onto the photosensitive drum 21, so as to form an electrostatic latent image onto the photosensitive drum 21 charged by the charger 24. Toner triboelectrically charged in the developing unit 25 is then attached onto the electrostatic latent image, thereby forming a toner image on the photosensitive drum 21. The toner image is transferred onto an intermediate transfer belt from the photosensitive drum 21. The toner image is further transferred onto a sheet conveyed from the sheet feeding cassette 26 located at the lower part of the apparatus, so that an image is formed on the sheet. The toner of the image transferred onto the sheet is fixed by the fixing unit 27, and the sheet is placed onto the sheet output tray of the post processing unit 28.

Referring now to FIG. 12, the scanning-type optical device 23 is described. Reference numeral 30 denotes a laser beam source that emits beams based on image information. Reference numeral 31 denotes a collimating lens that turns each laser beam emitted from the laser beam source 30 into a collimated light beam. Reference numeral 32 denotes a cylindrical lens that concentrates each laser beam to a belt-like form. Reference numeral 33 denotes a rotary polygon mirror that deflectively scans with a laser beam. Reference numeral 34 denotes a first imaging lens that concentrates a laser beam onto the photosensitive drum 21. Reference numeral 35 denotes a synchronization sensor that senses synchronization in the main scanning direction. Reference numeral 36 denotes an imaging lens that concentrates a laser beam that enters the synchronization sensor 35. Reference numeral 37 denotes an optical housing that houses the above described components. The opening of the optical housing 37 is covered with a lid.

In the image forming apparatus equipped with the scanning-type optical device 23, the temperature inside the image forming apparatus rises due to the heat generated from the fixing unit 27 and each motor or the like, and the spot diameter on the photosensitive drum 21 might become greater than a predetermined value. This is because there are changes in the refractive indexes of the lenses provided in the scanning-type optical device 23, due to the heat.

Also in the laser beam source, there are cases where the diameters of emitted laser beams differ from one another due to a temperature rise caused by the laser beam emission.

To counter this problem, glass lenses that exhibit smaller refractive index changes than the changes in the refractive indexes of the above described lenses are employed to restrict the variation of the spot diameters on the photosensitive drum 21. Japanese Unexamined Patent Publication No. 2002-006211 discloses a structure that sets the refractive indexes of lenses so as to cancel a focus deviation caused due to a temperature rise. However, any of the conventional methods cannot sufficiently solve the problem of spot diameter variations due to a temperature rise in the laser beam source.

To further counter this problem, Japanese Unexamined Patent Publication No. 10-142546 discloses a structure that adjusts a focus deviation by inserting a focus lens between an fθ lens and a photosensitive drum. Japanese Unexamined Patent Publication No. 09-105876 discloses a structure that measures each spot diameter with a CCD line sensor, and adjusts the spot diameter by moving the cylindrical lens. Japanese Unexamined Patent Publication No. 07-261103 discloses a structure that measures the magnification in each scanning operation with a sensor provided at either end outside the image region, and moves a mirror so as to reduce the magnification error.

In any of the above conventional scanning-type optical devices, a spot diameter is adjusted by moving a lens or a mirror along the light path. Therefore, it is necessary to secure a sufficient width for the movement and to employ a motor or the like. As a result, the apparatus becomes large in size.

SUMMARY OF THE INVENTION

A general object of the present invention is to provide a structure that can adjust the spot diameter of a laser beam, without an increase in the size of the apparatus.

A more specific object of the present invention is to provide an optical device that scans with a laser beam on an image bearing member, comprising: a laser beam source that emits a laser beam; a reflecting means that has a plurality of reflecting members and reflects the laser beam emitted from said laser beam source; a deflective scanning means that deflectively scans with the laser beam reflected by said reflecting means; and an adjusting means that moves at least part of said reflecting members, and adjusts the size of the laser beam entering the deflective scanning means.

The other specific objects of the present invention will become apparent from the following description.

DETAILED DESCRIPTION OF THE PREFERRED EMBODIMENT

The following is a description of preferred embodiments of the present invention, with reference to the accompanying drawings. It should be noted that the sizes, the materials, the shapes, and the relative locations of components according to the present embodiment are not limited to those of the following embodiments unless specific description.

First Embodiment

Figure 1:
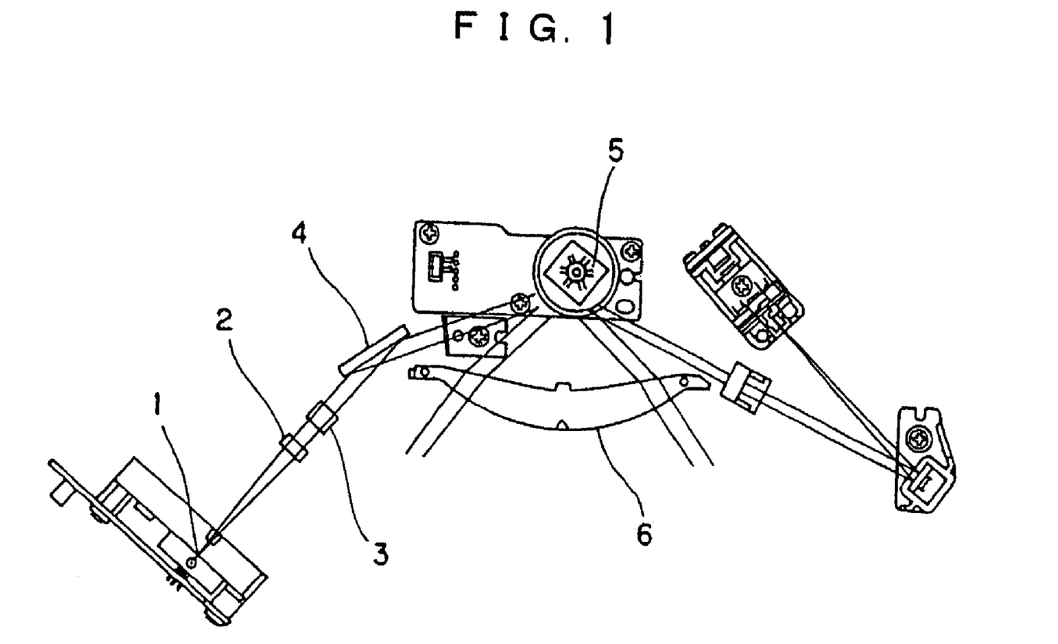
FIG. 1 illustrates a scanning-type optical device according to a first embodiment of the present invention.

FIG. 1 is a schematic view showing the optical paths and principal components of an optical device according to a first embodiment of the present invention. In FIG. 1, reference numeral 1 denotes a laser beam source that emits laser beams based on image information. Reference numeral 2 denotes a collimating lens as an optical component that turns each laser beam emitted from the laser beam source 1 into a collimated light beam. Reference numeral 3 denotes a cylindrical lens as an optical component that concentrates each laser beam to a belt-like form. Reference numeral 4 denotes a polygon mirror as a reflecting means that is formed with aligned minute reflecting members 7. Reference numeral 5 denotes a rotary polygon mirror as a deflective scanning means that deflectively scans with a laser beam. Reference numeral 6 denotes a first imaging lens as an optical component that concentrates a laser beam onto a photosensitive drum as an image bearing member. The above described components are housed in an optical housing, and the opening of the optical housing is covered with a lid. The optical housing and the lid have ribs and walls for reinforcement.

Figure 2:
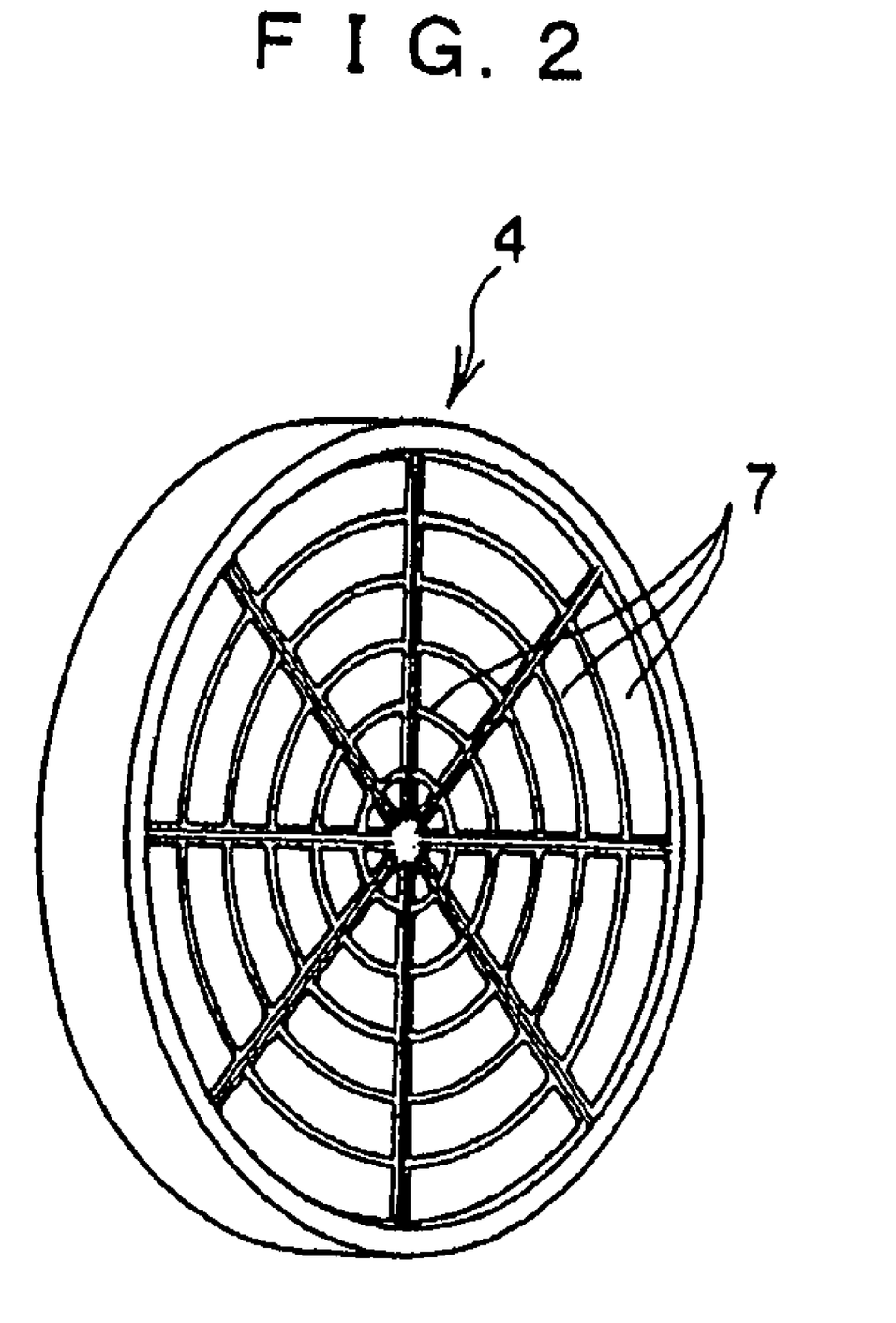
FIG. 2 is a perspective view of a polygon mirror according to the first embodiment of the present invention.

FIG. 2 is an enlarged view of the polygon mirror 4. This polygon mirror 4 is manufactured using a technique generally known as the MEMS (Micro Electro Mechanical Systems) technique. The MEMS technique is to use the exposure process, which is normally used for manufacturing a semiconductor, to integrally form a minute mechanism with an electric circuit on a semiconductor substrate. By this technique, a very small sensor or actuator that cannot be produced by a conventional method can be manufactured at a very low cost. In the past, Japanese Unexamined Patent Publication No. 7-175005 and others disclose techniques relating to galvanometer mirrors that are manufactured using a semiconductor manufacturing process.

Figure 3:
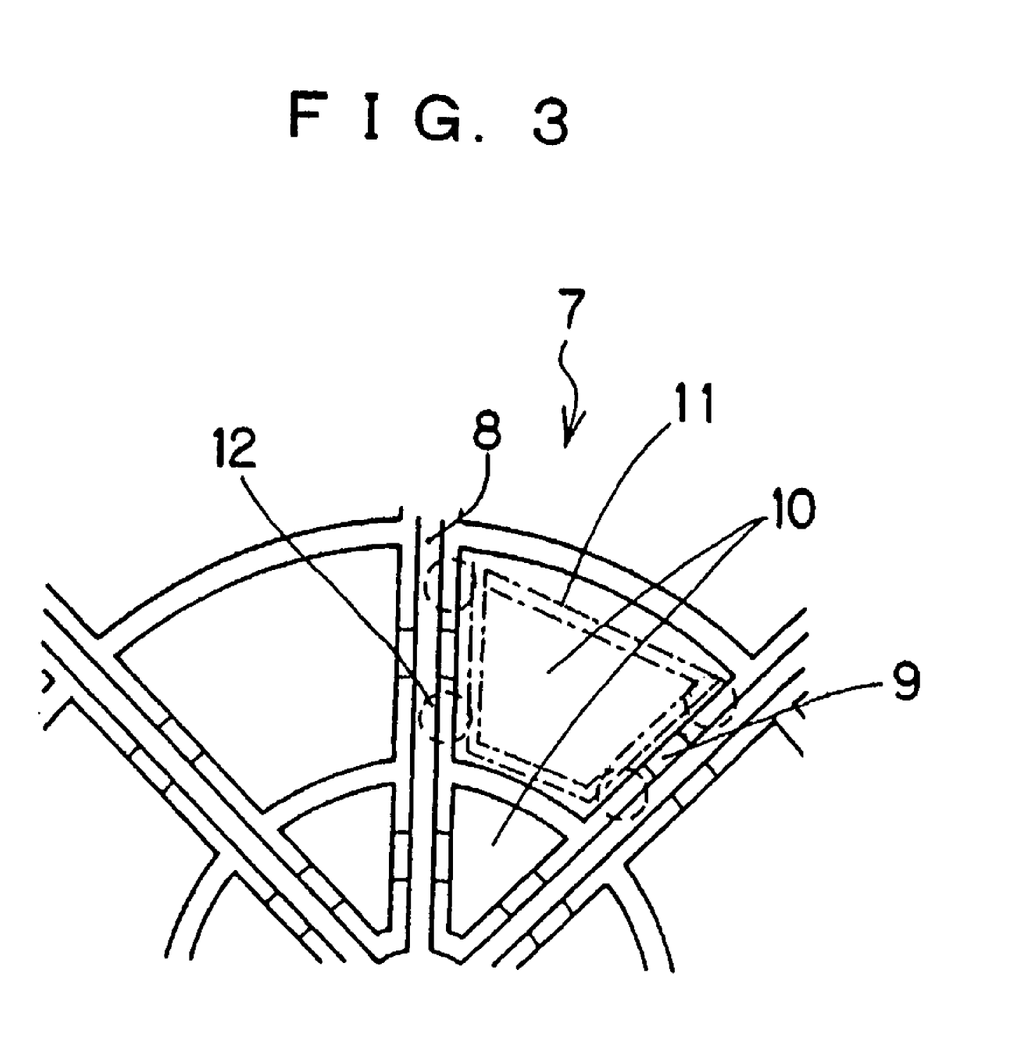
FIG. 3 illustrates the minute reflecting members of the polygon mirror according to the first embodiment of the present invention.

The polygon mirror 4 according to the present invention is now described in greater detail. In this embodiment, the polygon mirror 4 is laminated on a silicon substrate. FIG. 3 is an enlarged view of one of the minute reflection members 7 that are employed in the polygon mirror 4. A torsion bar 9 and a movable plate 10 that is a flat plate are integrally formed on a silicon substrate 8 by anisotropic etching. A flat coil 11 formed with a copper thin film that generates a magnetic field by energization is covered with an insulating film and is disposed on the upper peripheral portion of the movable plate 10. The flat coil 11 of this embodiment is integrally formed on the silicon substrate 8 by performing masking and etching on a silicon wafer, as a peripheral circuit can be formed at the same time as the formation of the above described structure by the MEMS technique. Alternatively, a coil that is produced in another step may be attached onto the substrate, so as to achieve the same effects as above. Reflecting mirrors are formed on the surface of the movable plate 10 through aluminum deposition, and permanent magnets 12 are disposed on the facing sides of the flat coil 11. The reflecting mirrors of the reflecting members 7 of this embodiment rotate based on the following principle. As current flows through the flat coil 11 (the driving unit) formed on the surface of the movable plate 10, magnetic force is generated between the magnets disposed on the facing sides, and the reflecting mirrors rotate in the direction of the magnetic force. The polygon mirror 4 of this embodiment has the minute reflecting members 7 that rotate according to this principle. Since the reflecting members 7 of the polygon mirror 4 are integrally formed with the frame of the silicon substrate 8 and the torsion bar 9, the reflecting members 7 come to a halt where the rotation angle (the rotational quantity) is in proportion to the magnetic force. Therefore, it is possible to control the reflection angle of each reflecting member 7 according to the intensity of the current.

Figure 4:
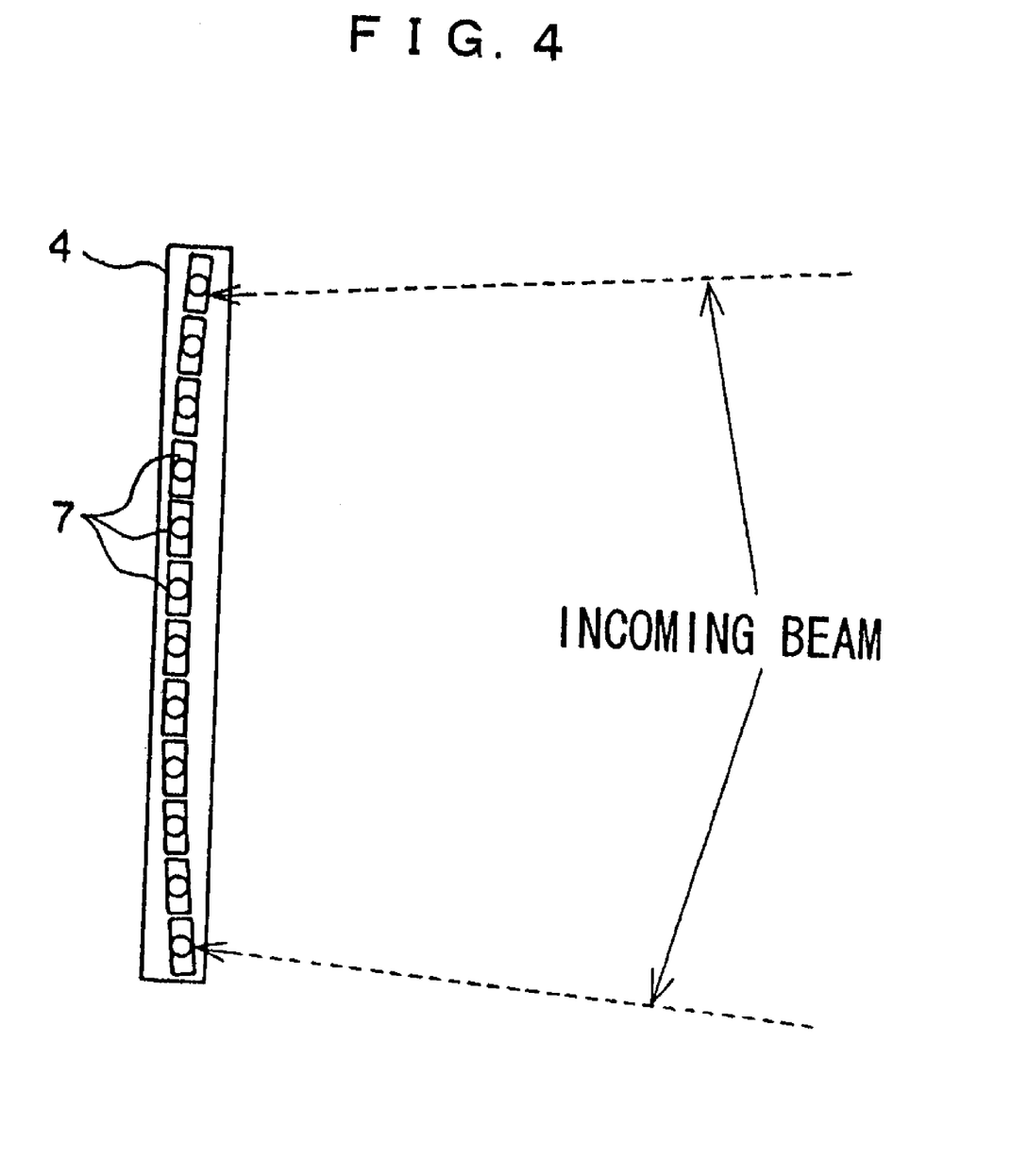
FIG. 4 illustrates a change of the reflecting surface formed by the entire polygon mirror according to the first embodiment of the present invention.

At the time of energization, the reflecting members 7 of the polygon mirror 4 rotate independently of one another, and form a concave surface, as shown in the section view of the polygon mirror 4 in FIG. 4. Each of the reflecting members 7 has a small enough area for the size of the incoming laser beam. Although the size of each of the minute reflecting members 7 is approximately 1/10 of the size of the incoming beam in the figure showing this embodiment, it is more preferable to be smaller. However, in a case where the polygon mirror 4 is formed with two reflecting members 7, it is possible to perform adjustment. Also, part of the reflecting members 7 may not be movable.

As described in the description of the related art, the temperature in an image forming apparatus rises with time due to the heat generated from the fixing unit or a heat source such as a motor provided in the apparatus. Because of this, the refractive index of each lens provided in the scanning-type optical device changes, and the imaging point of a laser beam shifts from the photosensitive drum on which the intended focal point is located. As a result, the spot diameter becomes large on the photosensitive drum. In this embodiment, the polygon mirror 4 is interposed between the laser beam source 1 and the rotary polygon mirror 5, so as to adjust a focus deviation. According to the adjusting method of this embodiment, under the condition that the temperature in the machine has not risen, for example, the condition immediately after the image forming apparatus is activated, the reflecting surfaces of the minute reflecting members 7 exhibit the same reflection angles, as shown in FIG. 2. Once the temperature rises, the reflection angles of the reflecting members 7 change so that the polygon mirror 4 forms a concave shape, as shown in FIG. 4. In this manner, the laser beam can be concentrated both in the main scanning direction and the sub-scanning direction.

Figure 5:
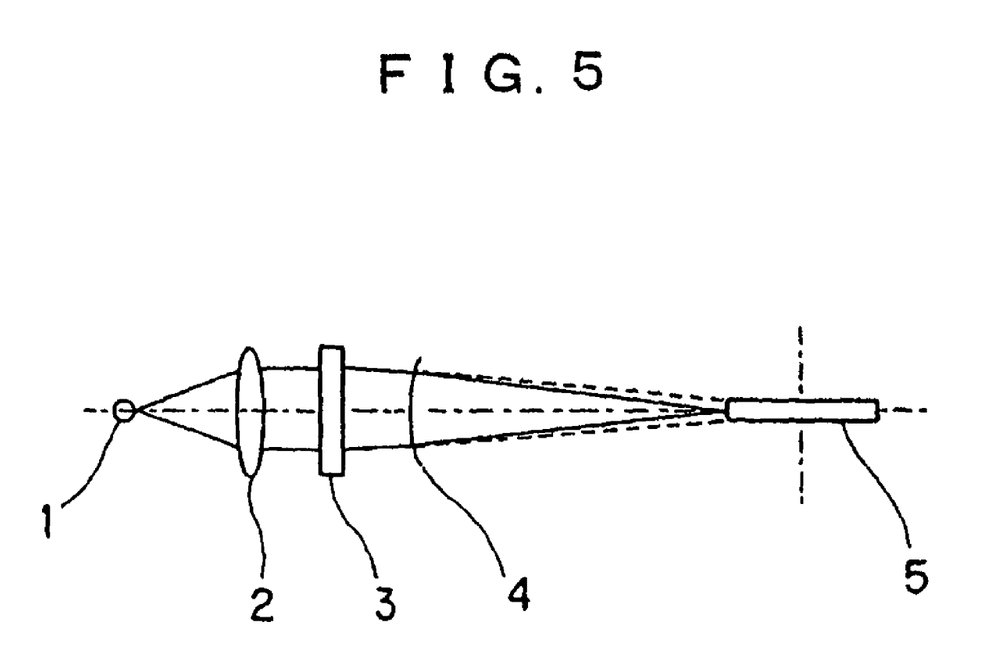
FIG. 5 illustrates the optical effects of the first embodiment of the present invention.

FIG. 5 schematically shows the optical light path in the sub-scanning direction, from the laser beam source 1 to the rotary polygon mirror 5 at the time of a temperature rise. In this embodiment, a control means that controls and adjusts the movement of each reflecting member 7 is employed. The curvature of the polygon mirror 4 cancels the variation of the refractive index of each lens, and exhibits a necessary rate to have laser beams concentrated onto the photosensitive drum. The broken lines in FIG. 5 indicate the light path of the focused light when there is a change in the refractive index of the cylindrical lens 3. As can be seen from FIG. 5, the light that should be concentrated onto the rotary polygon mirror 5 is concentrated onto another location. To counter this problem, the polygon mirror 4 is disposed in the light path, so that the light can be concentrated onto the rotary polygon mirror 5. In this manner, even if the focal point of a laser beam is changed due to a temperature rise, the focal point of the laser beam can be adjusted by the polygon mirror 4 and can be irradiated onto the rotary polygon mirror 5.

Also in this embodiment, the curvature of the cylindrical lens 3 varies with a temperature rise. Therefore, a temperature sensor is employed in the image forming apparatus (at or in the vicinity of the scanning-type optical device) so as to measure the temperature. According to the detected temperature variation, the curvature of the reflecting surface of the entire polygon mirror 4 is changed. In a case where a temperature rise is +5° C., the movement of each reflecting member 7 is controlled so that the curvature of the entire polygon mirror 4 becomes $1/100$. In a case where a temperature rise is +10° C., the movement of each reflecting member 7 is controlled so that the curvature of the entire polygon mirror 4 becomes $1/120$. In a case where a temperature rise is +15° C., the movement of each reflecting member 7 is controlled so that the curvature of the entire polygon mirror 4 becomes $1/150$. In this embodiment, the temperature sensor is employed to determine the curvature of the entire reflecting surface of the polygon mirror 4. However, the same effects can be achieved by changing the curvature of the entire reflecting surface of the polygon mirror 4 according to the result of the measurement carried out on the spot diameter on the photosensitive drum.

Since a spot diameter is inversely proportional to the diameter of a beam entering the imaging lens, each spot diameter can be made smaller by widening the diameter of the beam entering the imaging lens, and can be made greater by reducing the diameter of the beam entering the imaging lens. The curvature of the entire reflecting surface of the polygon mirror 4 can be changed in this manner, so that the optimum spot diameter can be set according to the resolution of each output image.

Further, the location of the polygon mirror 4 is not necessarily set between the cylindrical lens 3 and the rotary polygon mirror 5. The same effects as above can also be achieved even if the polygon mirror 4 is placed between the collimating lens 2 and the cylindrical lens 3.

In this embodiment, it is possible not only to adjust a spot diameter at the time of a temperature rise, but also to vary the spot diameter according to the resolution of each output image.

Second Embodiment

Figure 6:
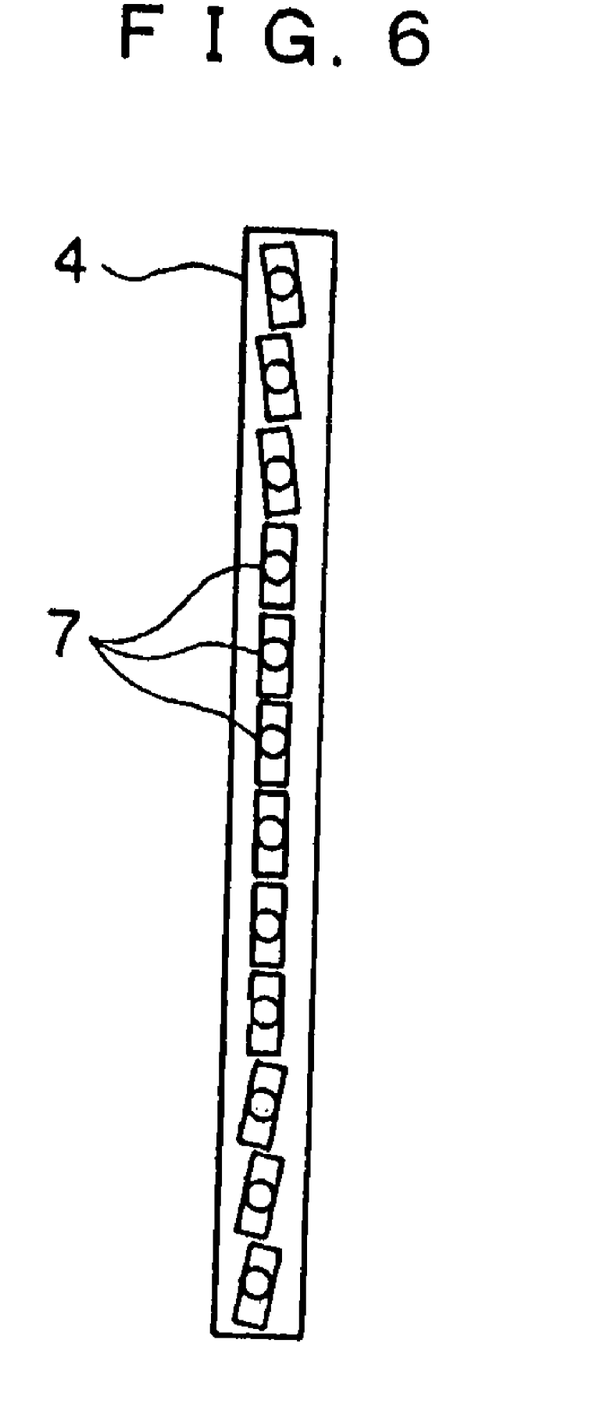
FIG. 6 illustrates a change of the reflecting surface formed by the entire polygon mirror according to a second embodiment of the present invention.
Figure 7:
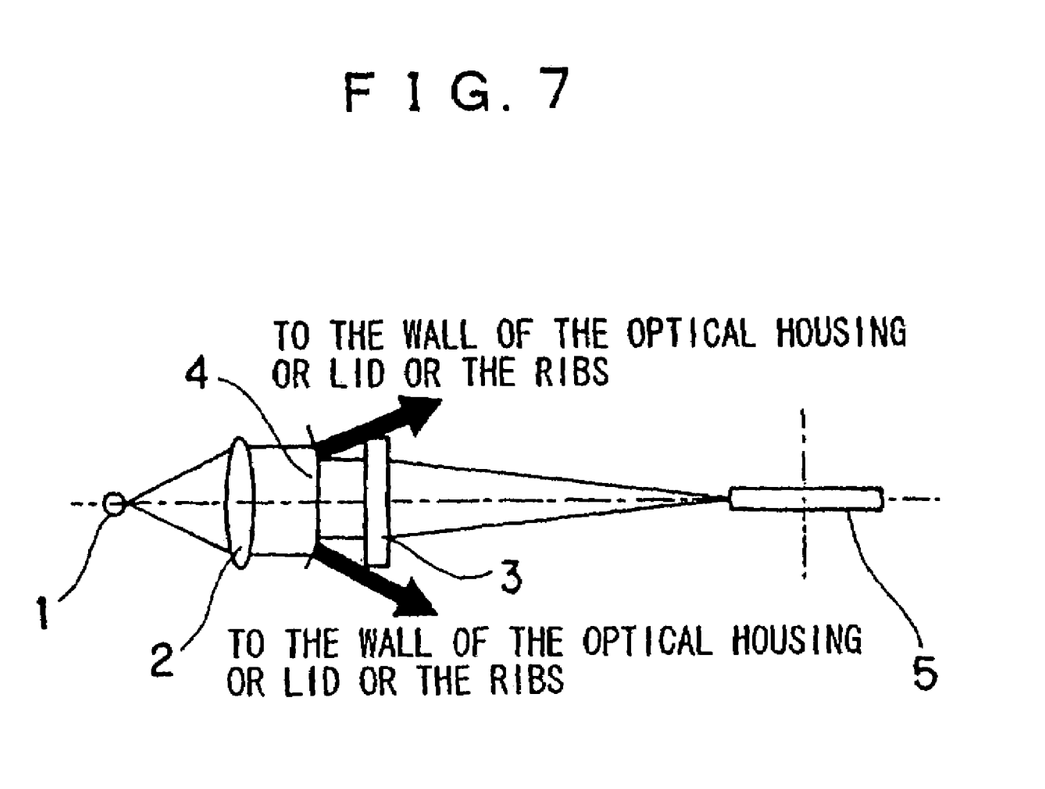
FIG. 7 illustrates the optical effects of the second embodiment of the present invention.

FIGS. 6 and 7 illustrate a second embodiment of the present invention. Explanation of the same components as those of the first embodiment is not repeated in the following description.

FIG. 6 is a cross-sectional view illustrating the reflection angle of the polygon mirror 4 of this embodiment. The polygon mirror 4 of this embodiment has a structure in which the reflection angle of the reflecting member 7 at either end differs from the reflection angle of the reflecting member 7 in the center. This is because the light of the unnecessary area does not enter the rotary polygon mirror 5, and is reflected by the wall or the ribs of the optical housing or the lid to be absorbed.

FIG. 7 is a schematic view of the optical arrangement in this embodiment. The polygon mirror 4 that is formed by the MEMS technique as in the first embodiment is interposed between the collimating lens 2 and the cylindrical lens 3. Since the polygon mirror 4 of this embodiment is manufactured through the same procedures as those of the first embodiment, the reflection angle of the reflecting surface of each reflecting member 7 is controlled independently by an adjusting means. A laser beam is emitted onto a wider area than the diameter of a light beam necessary to obtain a predetermined spot diameter on the reflecting surface of the polygon mirror 4. As can be seen from FIG. 7, the laser beam entering outside the predetermined region is prevented from entering the rotary polygon mirror 5 by the reflecting members 7 located at the end portions of the polygon mirror 4 of this embodiment, and is thus shielded by the wall or the ribs of the optical housing or the lid.

A laser beam is emitted onto a wider area than the predetermined area in this embodiment, so as to vary each spot diameter according to the resolution. Here, the diameter of the light beam is approximately the same as the minimum spot diameter. As described in the first embodiment, where it is necessary to increase the output resolution and to reduce the spot diameter, the reflection angles of the reflecting members 7 on the end portions of the polygon mirror 4 are changed, and the laser beam entering region on the polygon mirror 5 is widened so as to also widen the diameter of the light beam to enter the imaging lens. As a result, the spot diameter can be reduced. By this method, each spot diameter can be changed according to the output resolution.

As in the first embodiment, the polygon mirror 4 is not necessarily located between the cylindrical lens 3 and the rotary polygon mirror 5. The same effects as above can be achieved even if the polygon mirror 4 is placed between the collimating lens 2 and the cylindrical lens 3.

In this embodiment, the optimum spot diameter can be set with a compact structure according to the resolution of each image to be output.

Third Embodiment

Figure 8:
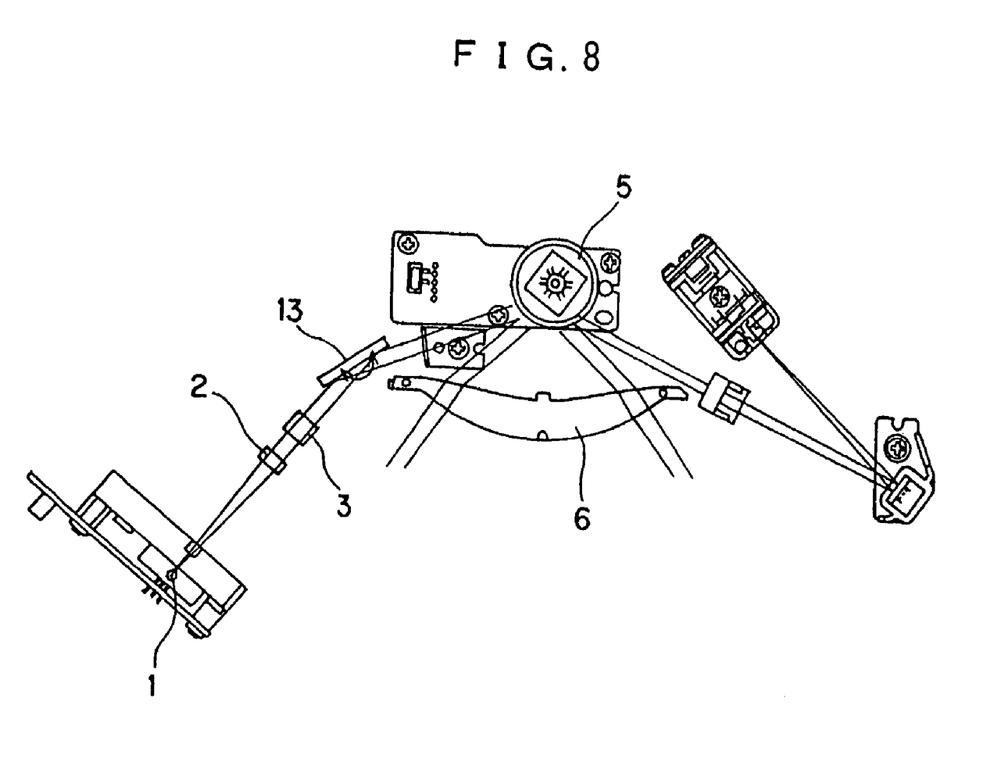
FIG. 8 illustrates a scanning-type optical device according to a third embodiment of the present invention.

FIG. 8 illustrates a third embodiment of the present invention. Explanation of the same components as those of the first and second embodiments is not repeated in the following description.

Figure 9:
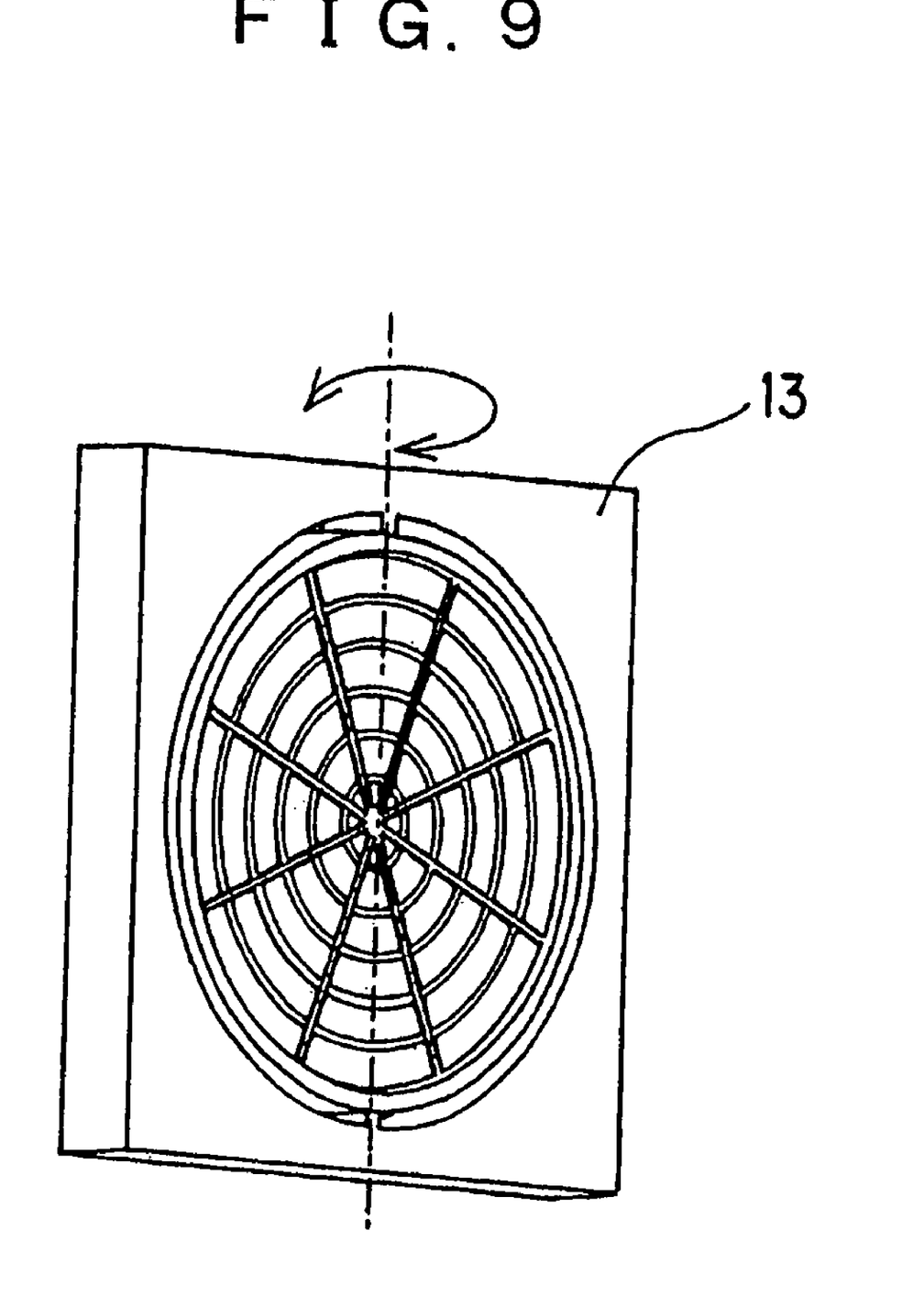
FIG. 9 is a perspective view of the polygon mirror according to the third embodiment of the present invention.

In this embodiment, a polygon mirror 13 shown in FIG. 9 is disposed between the cylindrical lens 3 and the rotary polygon mirror 5. This embodiment further includes a second torsion bar (not shown) to rotate the same mirror as the polygon mirror 4 of the first and second embodiments, so that the entire polygon mirror 13 can be rotated in the direction indicated by the arrow in FIGS. 8, 9. Like the minute reflecting members 7 of the polygon mirror 4 of the first and second embodiments, the polygon mirror 13 is manufactured by the MEMS technique. The torsion bars integrally formed by anisotropic etching are disposed to extend in a direction perpendicular to the optical housing to be attached.

Accordingly, when current is applied, the polygon mirror 13 can be rotated in the direction indicated by the arrow in FIGS. 8, 9, and the applied current is varied as alternating current, so as to vibrate the polygon mirror 13. In this embodiment, each spot diameter is adjusted with this structure, and the magnification of each image is also adjusted.

Figures 10A, 10B:
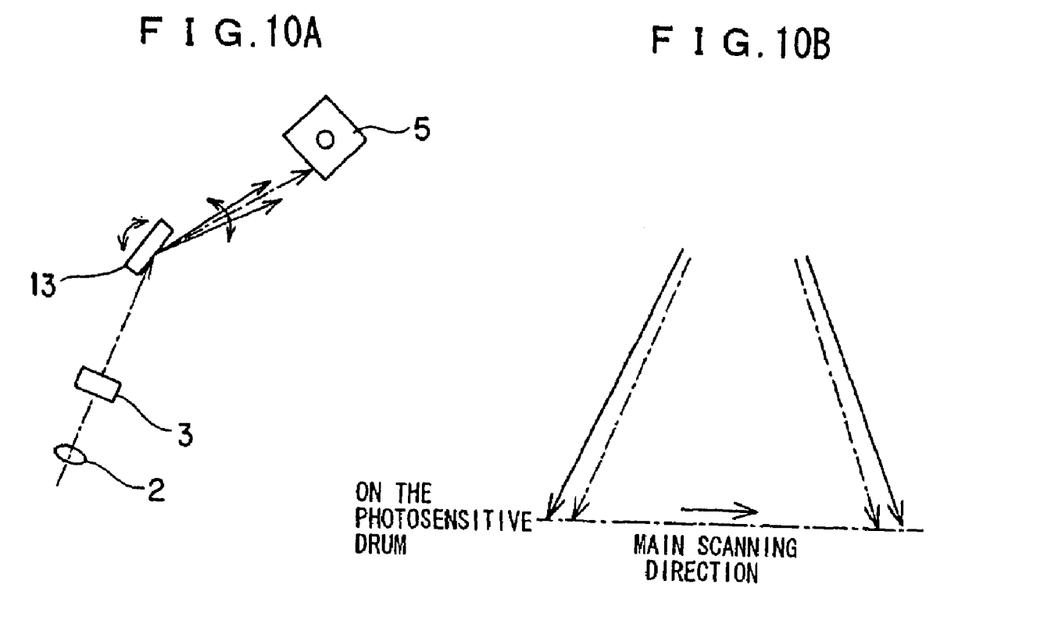
FIGS. 10A and 10B illustrate the optical effects of the third embodiment of the present invention.

FIGS. 10A and 10B illustrate the principle of the adjusting operation. As shown in FIG. 10A, the light beam that enters the rotary polygon mirror 5 at an angle indicated by the broken line when the polygon mirror 13 is in a stationary state is changed through a small angle, as indicated by the solid line, by minutely vibrating the polygon mirror 13 with alternating current. The deflecting angle formed by the rotary polygon mirror 5 is then slightly changed. As a result, the irradiation position after the deflection is changed in the main scanning direction from the broken line to the solid line, as shown in FIG. 10B.

When the magnification of an image changes with a temperature rise or the like, the polygon mirror 13 is vibrated at the same frequency as the cycle of scanning the photosensitive drum with the rotary polygon mirror 5. The vibration amplitude (the rotation angle) of the polygon mirror 13 can be changed according to the variation of the magnification. With the structure of this embodiment, the irradiation position can be adjusted to the main scanning direction on the photosensitive drum, and thus, the magnification of each image can be adjusted.

Also, as described in the first and second embodiments, the reflection angle of each of the reflecting members 7 of the polygon mirror 13 is adjusted so as to adjust the magnification as well as the spot diameter.

The adjusting value for the magnification of each image may be calculated by directly measuring the magnification with a spot diameter measuring sensor or the like provided in the image forming apparatus. However, it is also possible to use a magnification adjusting value that can be estimated from a temperature rise measured with a temperature sensor provided in the image forming apparatus. In general, the magnification adjusting value varies with the degree of each temperature rise. If the temperature rise is small or the variation of the entire magnification is narrow, the rotation angle should be small. If the temperature rise is great or the variation of the entire magnification is wide, the rotation angle should be great. Further, the magnification may be adjusted every time it changes with respect to a value that is preset in the image forming apparatus, or may be adjusted only when the temperature becomes higher than a predetermined temperature.

In this embodiment, the magnification of each image can be maintained uniform, regardless of an environmental change such as a temperature rise. Thus, stable image quality can be provided.

Although the present invention has been described by way of examples, it is not limited to the above described embodiments, and various modifications may be made to it without departing from the scope of the present invention.

This application claims priority from Japanese Patent Application No. 2004-168043 filed Jun. 7, 2004, which hereby incorporated by reference herein.

The invention claimed is:

1. An image forming apparatus comprising:
   an image bearing member which has a photosensitive layer;
   a light source which emits a laser beam;
   an optical component which transmits the laser beam emitted from the light source;
   a rotary polygon mirror for deflecting and scanning on a surface of the image bearing member with the laser beam which is transmitted through the optical component;
   reflecting means provided in a light path from the light source to the image bearing member and reflecting the laser beam emitted from the light source, wherein the reflecting means has a plurality of movable reflecting members on a reflecting surface;
   adjusting means for adjusting a position of the plurality of reflecting members for adjusting the size of the laser beam to irradiate the surface of the image bearing member;
   developing means for developing with a toner an electrostatic latent image formed on the image bearing member as the laser beam irradiates the surface of the image bearing member;
   transferring means for transferring a toner image developed with the toner to a recording material; and
   fixing means for fixing the toner image transferred on the recording material,
   wherein, when the temperature of the optical component rises, the reflecting members are moved to form a concave plane on the entire reflecting surface of the reflecting means.

2. The image forming apparatus according to claim 1, wherein the adjusting means adjusts a diameter of the laser beam according to the temperature of the optical component.

3. The image forming apparatus according to claim 1, wherein, when the temperature of the optical component rises, the reflecting members are moved so as to make the size of the laser beam smaller.

4. The image forming apparatus according to claim 1, further comprising moving means that moves the reflecting members,
   wherein the movable reflecting members and the moving means are disposed on a semiconductor substrate.

5. The image forming apparatus according to claim 1, wherein the reflecting members are movable and rotate to change the reflection angle of the laser beam.

6. The image forming apparatus according to claim 1, wherein the reflecting members are movable and can move independently of one another.

7. The image forming apparatus according to claim 1, further comprising a spot diameter detecting member that detects the spot diameter of the laser beam,
   wherein the adjusting means changes the size of the laser beam according to the output of the spot diameter detecting member.

8. The image forming apparatus according to claim 1, further comprising selecting means that selects resolution for each image that is output from the image forming apparatus,
   wherein the size of the laser beam is changed according to the selected resolution.

9. The image forming apparatus according to claim 1, wherein the adjusting means adjusts quantity of the laser beam reflected toward the image bearing member by the reflecting means.

* * * * *